United States Patent [19]
Hirschberger

[11] Patent Number: 5,204,120
[45] Date of Patent: Apr. 20, 1993

[54] INTERMITTENT MULTI-LAYER MULTI-PARISON EXTRUSION HEAD

[75] Inventor: Michael Hirschberger, Sylvania, Ohio

[73] Assignee: Hoover Universal, Inc., Plymouth, Mich.

[21] Appl. No.: 900,195

[22] Filed: Jun. 17, 1992

Related U.S. Application Data

[63] Continuation-in-part of Ser. No. 849,827, Mar. 11, 1992, which is a continuation of Ser. No. 429,403, Oct. 31, 1989, abandoned.

[51] Int. Cl.⁵ ................... B29C 47/06; B29C 47/22
[52] U.S. Cl. .................... 425/132; 264/209.8; 425/133.1; 425/141; 425/462; 425/466
[58] Field of Search .......... 425/132, 133.1, 133.5, 425/131.5, 256, 467, 466, 141, 381, 382.4, 462; 264/173, 177.16, 209.1, 209.8

[56] References Cited

U.S. PATENT DOCUMENTS

| | | | |
|---|---|---|---|
| 4,042,661 | 8/1977 | Cook | 425/462 |
| 4,047,868 | 9/1977 | Kudo et al. | 425/133.1 |
| 4,472,129 | 9/1984 | Siard | 425/467 |
| 4,657,497 | 4/1987 | Dehennau et al. | 425/133.1 |
| 4,890,994 | 1/1990 | Shapler et al. | 425/131.1 |
| 4,934,915 | 6/1990 | Kudert et al. | 425/132 |
| 5,046,938 | 9/1991 | Hirschberger | 425/131.1 |

Primary Examiner—Jay H. Woo
Assistant Examiner—Khanh P. Nguyen
Attorney, Agent, or Firm—Harness, Dickey & Pierce

[57] ABSTRACT

A multi-layer, multi-parison extrusion head in which nearly identical parisons are extruded from each extrusion station of the head when operated in an intermittent mode. Resin passages are provided within the extrusion head for supplying each of the resins to each extrusion station with the passages configured in a manner such that the ratio of resin volume for one resin in the passages for a given extrusion station compared to the volume of a second resin in the flow passages to the same extrusion station is the same for all extrusion stations while the volumes of resins feeding each station are not equal. As a result, a relatively simple configuration of passages is provided without requiring all of the passages to be of equal length.

17 Claims, 5 Drawing Sheets

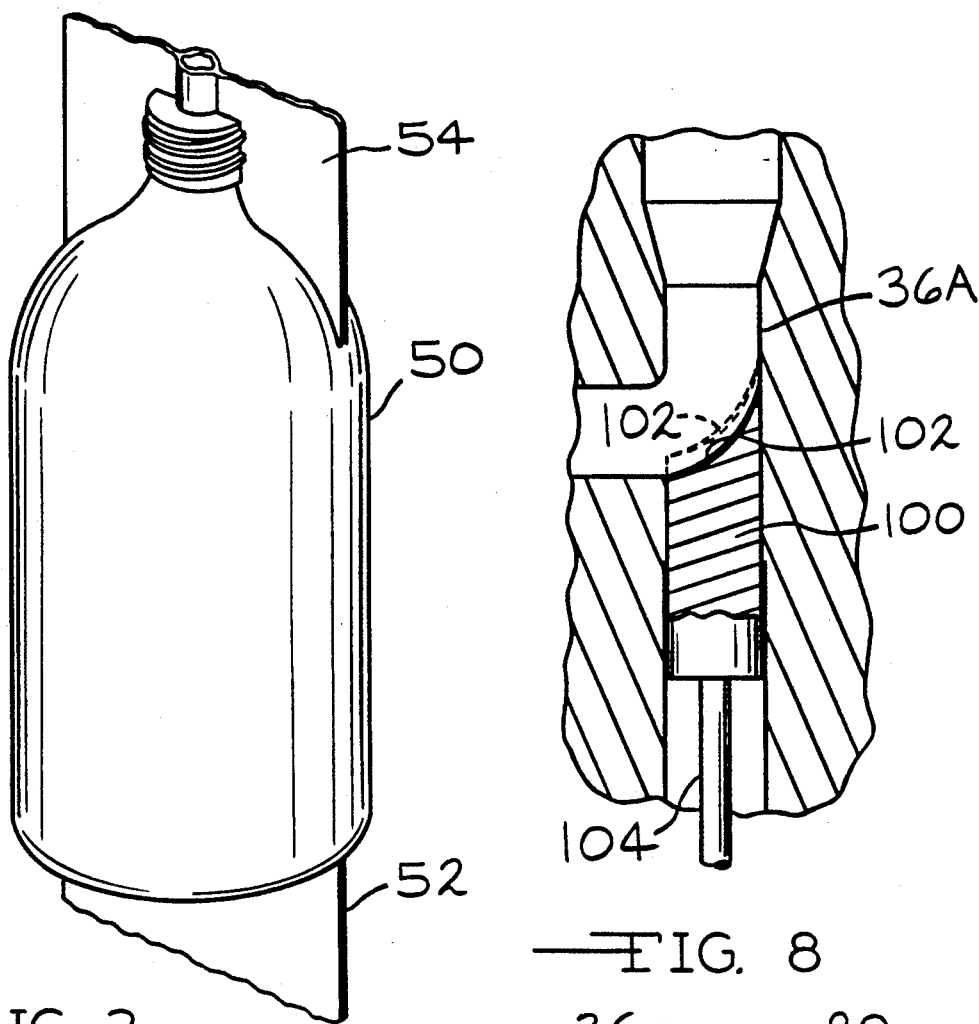
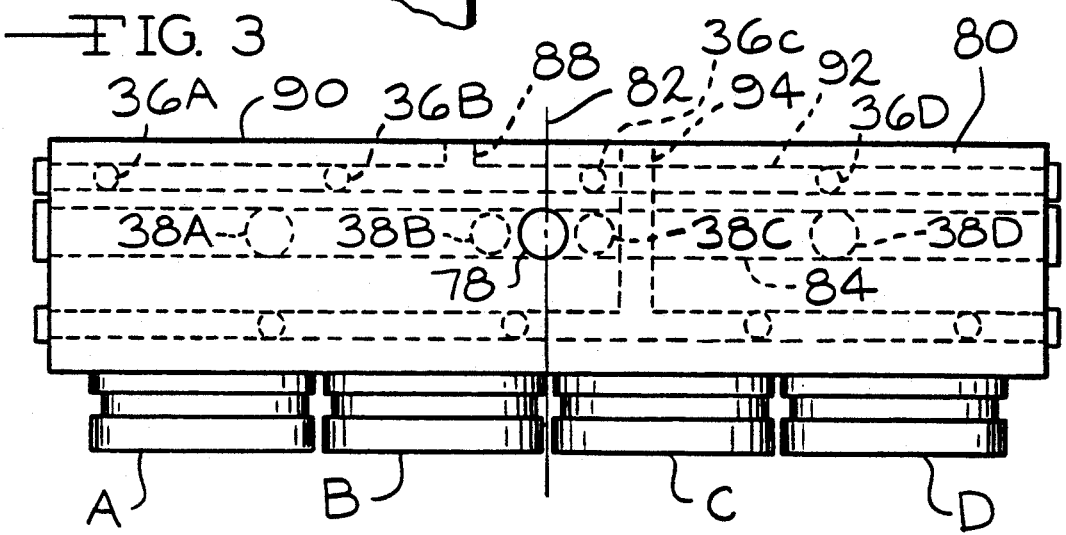

INTERMITTENT MULTI-LAYER MULTI-PARISON EXTRUSION HEAD

CROSS REFERENCE TO RELATED APPLICATIONS

This is a continuation-in-part of the U.S. patent application Ser. No. 849,827 filed Mar. 11, 1992, pending, which is a continuation of U.S. patent application Ser. No. 429,403 filed Oct. 31, 1989, now abandoned.

BACKGROUND AND SUMMARY OF THE INVENTION

The present invention relates to a multi-layer extrusion head and in particular to one for intermittent extrusion of multiple parisons.

While it has previously been known to intermittently extrude a single thermoplastic parison having multiple layers of resin, and it has also been known to simultaneously extrude multiple parisons of a single resin layer, the intermittent extrusion of multiple parisons having multiple resin layers from a single extrusion head has not previously been successfully performed. The apparatus of the present invention seeks to combine the intermittent multi-layer extrusion with a multiple parison extrusion head to achieve the added production capability of multiple parison extrusion with intermittently extruded multiple layer parisons. The challenge in doing so is to produce parisons which, to the greatest extent possible, are identical with one another regardless of from which station of the extrusion head the parison is extruded.

With an intermittent extrusion process, with the beginning of each extrusion cycle or shot, when the piston, plunger, or reciprocating screw begin to move to push the resin, the resin within the flow passages will undergo a certain amount of compression. As a result of the resin compression, there will be a delay between the time when the plunger etc. begins to move and the time when resin begins to flow from the outlet orifice of each extrusion station. This delay is referred to throughout this specification as the compression delay. The length of the compression delay is directly related to the volume of resin within the resin passages between the extruder screw or accumulator and the extrusion station within the extrusion head. The compression delay does not create a difficulty with a single parison multi-layer intermittent extrusion head since the start time for each piston etc. for each of the resin layers can be controlled, taking into account the compression delay so that the flow of resin for each layer from the outlet orifice of the extrusion head begins at the desired time to form the desired parison wall structure. However, with multiple parison extrusion, due to the added flow passages necessary to feed resin to multiple extrusion stations, the compression delay now presents a greater obstacle. If the compression delays are not properly accounted for in programming the machine sequence, defects can be formed along the entire length of the parison, not just at the beginning of each parison.

It is an object of the invention to provide an intermittent multi-layer multi-parison extrusion head which overcomes the difficulties presented by compression delay in the resin to produce nearly identical parisons from each of the extrusion stations.

In order to regulate the resin flow, the resin flow passages are typically equipped with flow plugs that can be adjusted providing varying degrees of restriction within the flow passages. In doing so, the plugs typically produce stagnation of the resin immediately behind the plug where the resin can dwell and ultimately degrade. It is a further object of the present invention to eliminate the pockets of stagnating material behind a flow plug while maintaining flow control. It is a still further object to provide flow control devices within the extrusion head which are accessible from the front of the extrusion head for ease in making adjustments.

One way to accommodate the compression delay and produce multiple, identical parisons is to provide the resin flow passages to each extrusion station with equal volumes of resin. With equal resin volume flow passages, the compression delay of each resin for each station will be identical. This can be accomplished in one of two ways. First, the longest flow passage can be made with the smallest diameter while the shortest passage is made with the largest diameter so that the volume of resin in each passages is equal. However, this has the disadvantage of dramatically increasing the pressure drop required due to the greater resistance to resin flow in the smaller diameter passages, resulting in slower extrusion rates.

Alternatively, equal resin volume can be produced by a continuous branching scheme where the main resin stream is divided into two and each of those streams are divided into two, etc., until the desired number of resin streams is reached. The resin volume between the extruder screw and each extrusion station will be equal. While such a branching scheme achieves the desired result of equal compression delay, the manifold necessary for supplying the resins to the extrusion stations is relatively large in size and is complex to manufacture. The continuous branching scheme can only be used with an extrusion head having 2, 4, 8, 16 etc. extrusion stations. It can not be used with an extrusion head having, for example, six stations or an odd number of stations. The continuous branching scheme, while achieving the first objective of the invention, is not a preferred embodiment.

Applicant has found that the volume of the flow passages, and hence the amount of the compression delay, need not be identical for all parisons but that the sequence of events for the extrusion of each parison must be the same if identical parisons are to be produced. For example, if in a three layer parison it is necessary for the two outer layers to begin flow slightly before the center layer to produce a satisfactory parison, this sequence must be followed in each of the multiple extrusion stations. While the compression delay depends upon the volume of resin in the flow passages, to have the same sequence of events for each station, it is sufficient that the volume ratios of the resin flow passages with respect to the layers within one parison be the same as for the other parisons. For example, with a three layer extrusion device, the ratio of the resin volume in the flow passages for the inner layer to the outer layer for one extrusion station must be the same, as for the other extrusion stations. While this will automatically be true for the continuous branching scheme in which the resin volumes from one station to the next are the same, a more simplified and compact passage configuration scheme can now be employed in which the resin volumes are not equal but the volume ratios are equal.

Further objects, features and advantages of the invention will become apparent from a consideration of the following description and the appended claims when taken in connection with the accompanying claims.

BRIEF DESCRIPTION OF THE DRAWINGS

FIG. 3 is a perspective view of a blow molded bottle prior to removal of the flash at the bottom and top of the bottle;

FIG. 4 is a rear elevational view of the extrusion head showing the resin distribution passages therein;

FIG. 8 is a sectional view showing the streamlined flow plugs used to regulate the resin extrusion rate.

DETAILED DESCRIPTION OF THE INVENTION

Figure 1:
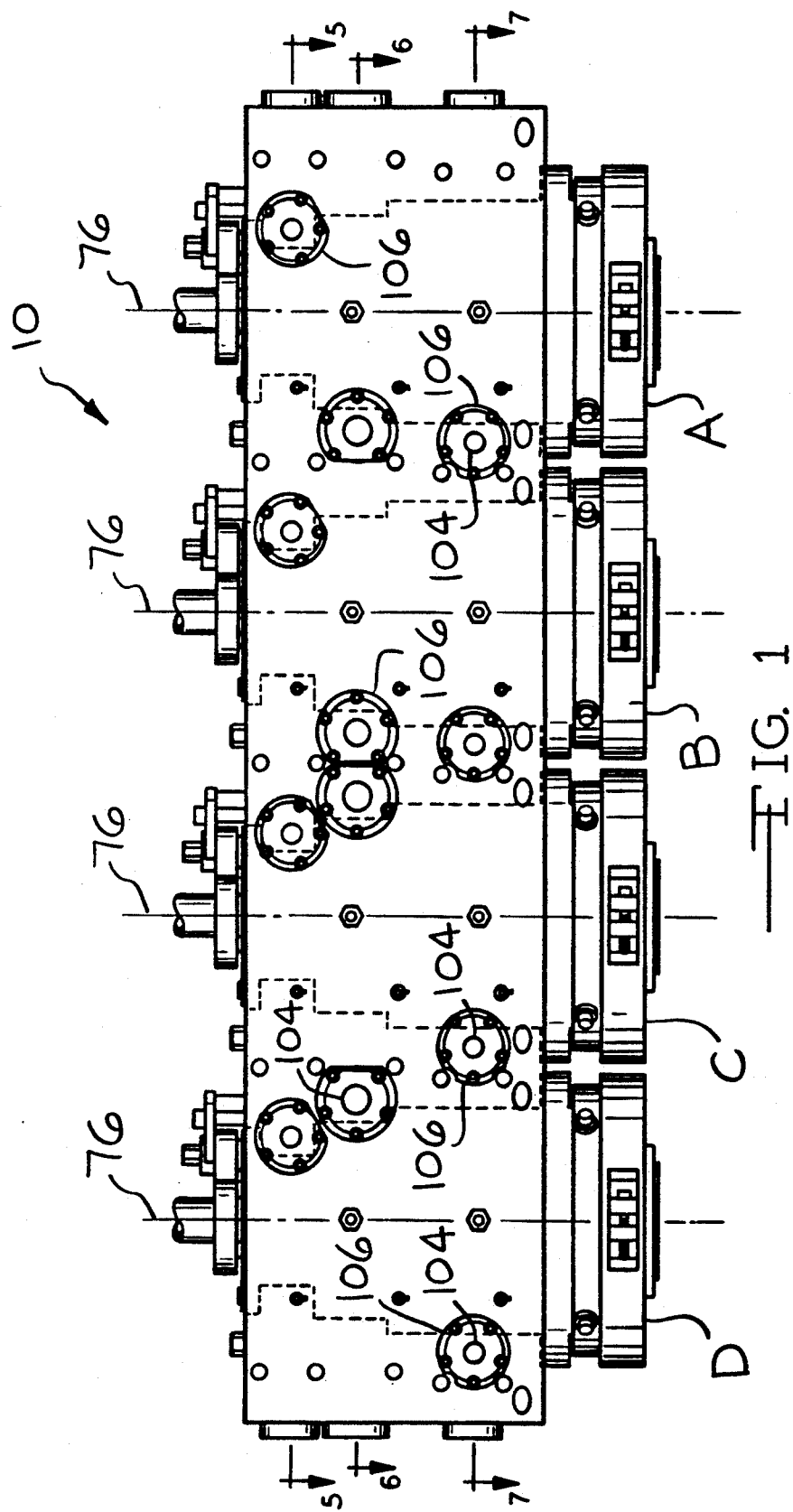
FIG. 1 is a front elevational view of the extrusion head of the present invention.

The extrusion head of the present invention is shown in FIG. 1 and designated generally at 10. Extrusion head 10 includes four extrusion stations A, B, C and D. In the embodiment shown, the stations extrude parisons having three layers of different thermoplastic resins. While the invention is described in the context of a three layer extrusion machine, it is to be understood that the present invention can be embodied in a machine for extruding any number of layers as desired.

Figure 2:
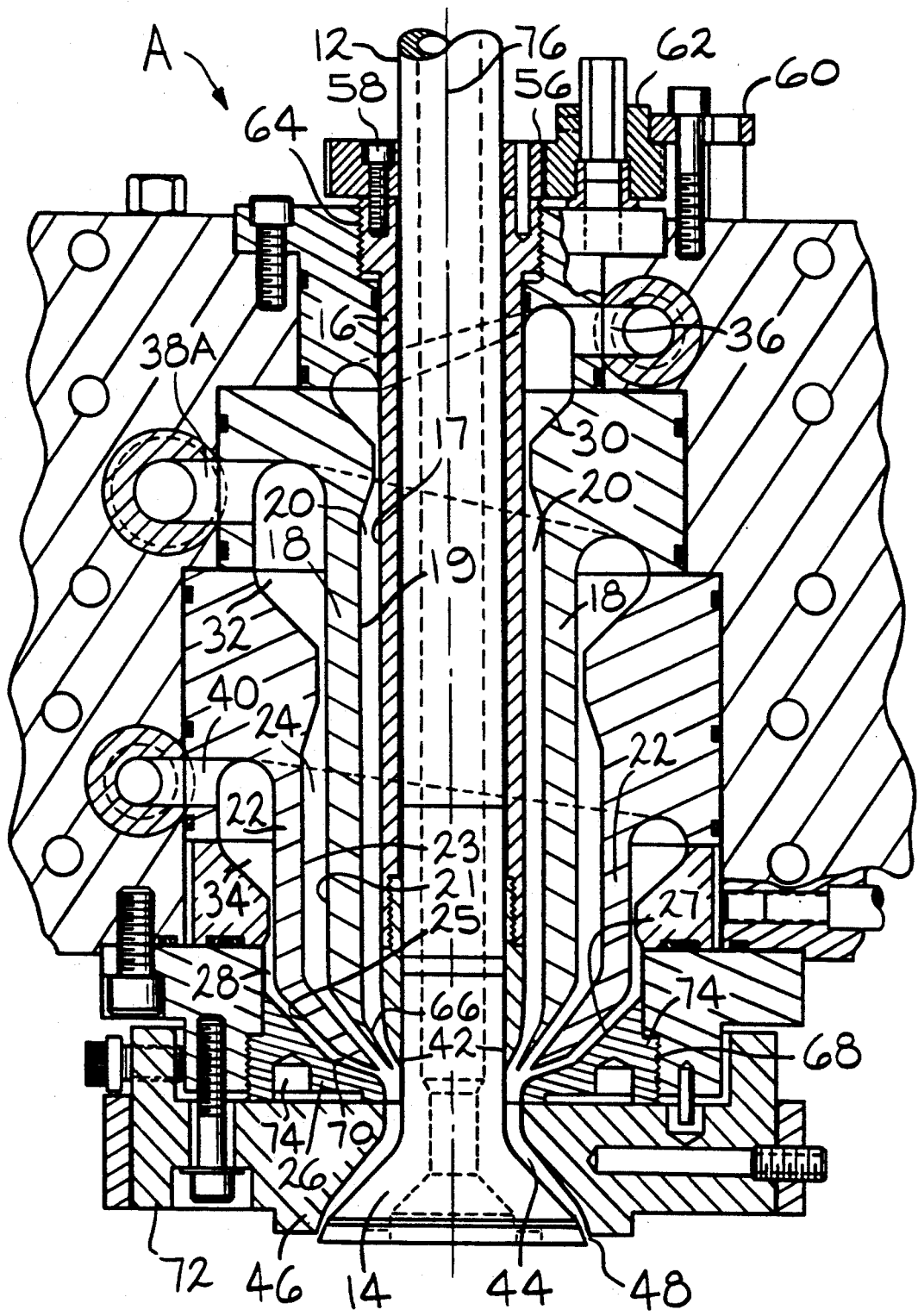
FIG. 2 is an enlarged sectional view of one extrusion station in the extrusion head shown in FIG. 1.

The internal details of extrusion station A are shown in FIG. 2. Extrusion station A is built around a hollow center tube 12 and a mandrel 14 mounted to the lower end of the tube 12. The body surrounding the sleeve 12 defines three separate resin flow passages for the three resin layers to flow through. The flow passages are defined in part by a cylindrical sleeve 16 surrounding the center tube 12, a generally cylindrical divider 18, a generally cylindrical divider 22 and a ring 26. The inner flow passage 20 is defined by the outer surface 17 of the sleeve 16 and the inner surface 19 of divider 18. The middle flow passage 24 is defined by the outer surface 21 of divider 18 and the inner surface 23 of divider 22. The outer flow passage 28 is formed by the outer surface 25 of divider 22 and the inner surface 27 of ring 26.

The upper ends of the flow passages 20, 24 and 28 are each formed with annular receiving portions 30, 32 and 34 respectively. These annular receiving portions receive thermoplastic resin from gates 36, 38 and 40 respectively. The resins from each of the flow passages 20, 24 and 28 merge together near the base of the extrusion head at 42 as the resins flow into a main passage 44. The main passage is formed by the mandrel 14 and annular die 46. Annular die 46 is mounted to the bottom of the extrusion head by a plurality of bolts 47.

At the point where two or more resin layers merge, in an intermittent extrusion head, certain imperfections or discontinuities are created at the initiation of each extrusion cycle. These imperfections are influenced by a variety of factors including accumulator filling pressures, flow delays, flow acceleration modes, etc. An annular line or other imperfection noticeable in a finished molded product can result.

By merging all of the layers together at a single location, only one such defect is produced rather than multiple defects axially spaced in the parison. With only one such defect, it is possible and preferable to eliminate the portion of the parison containing the defect from the finished product. This can be accomplished by sizing the main passage 44 between the resin merger point 42 and the annular outlet orifice 48 such that the volume of the main passage is less than the volume of resin used to form the tail flash in the finished product. This is better described with reference to FIG. 3.

In FIG. 3, a blow molded bottle 50 is shown upon removal from the mold. A portion of the parison forms a tail flash 52 and a neck flash 54 while the remainder of the parison forms the blow molded bottle 50. The flashes 52 and 54 are removed from the bottle to produce a finished container. By sizing the main passage 44 in the extrusion head such that the volume of resin contained therein, between merger point 42 and outlet orifice 48, is less than the volume of resin contained in the tail flash 52, the portion of the parison containing the defect formed at the merger point 42 will be in the tail flash 52. Since this portion of the parison does not form a portion of the finished container 50, no defect will be present in the finished container.

Figure 9:
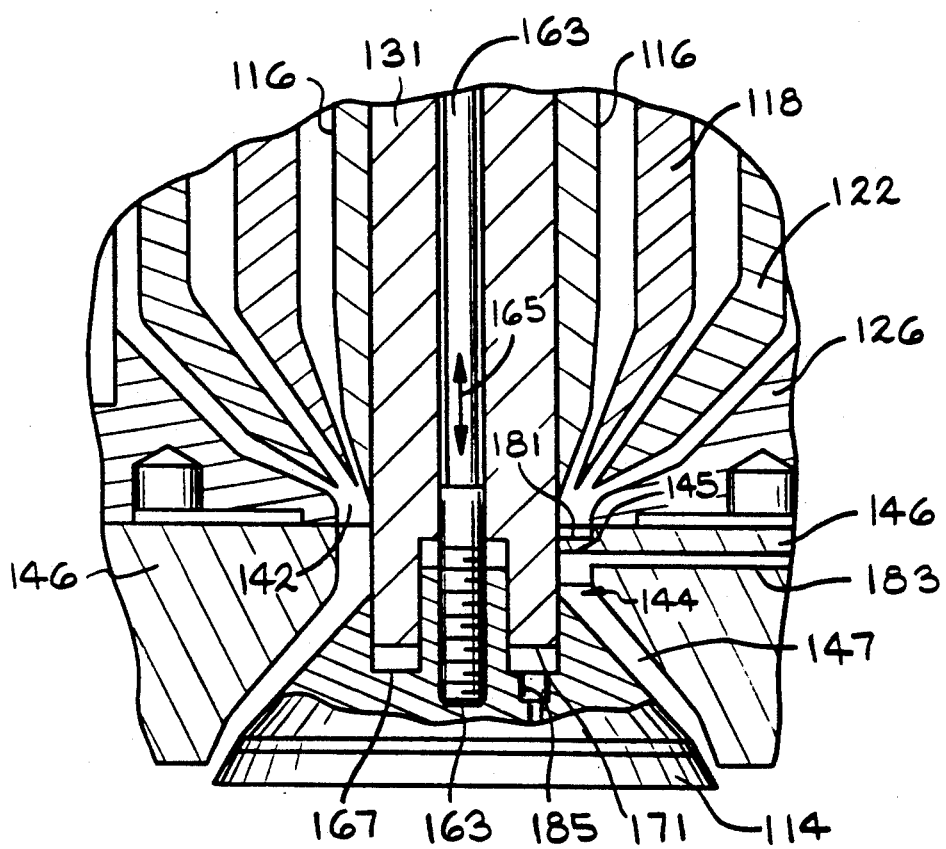
FIG. 9 is an enlarged sectional view of an alternative embodiment of the lower portion of an extrusion station.

In addition to the defect created at the beginning of each extrusion cycle, further defects such as distortion of the layer structure can be created by locating the resin merger location adjacent to the mandrel 14 which is movable axially during the extrusion process for programming the parison wall thickness. Such an arrangement is shown in FIG. 2. An alternative embodiment of the extrusion station lower end is shown in FIG. 9 in which similar elements are given the same reference numeral as in FIG. 2 with the addition of 100. In the embodiment of FIG. 9, the resin merger location is positioned adjacent to a stationary inner sleeve 131, inside sleeve 116, as opposed to being positioned adjacent to the movable mandrel 114. The movable mandrel 114 includes a circular recess 167 into which the lower end 171 of the sleeve 131 is inserted. A movable rod 163 is threaded into the mandrel and is controlled by drive means (not shown) to move the mandrel up and down as shown by arrow 165 for the purpose of parison programming. However, the mandrel is positioned below the resin merger point 142 such that resin merger takes place adjacent to the stationary sleeve and the stationary die 146 at the base of the extrusion station. After the resin flows downstream axially along the sleeve 131 surface, in a first axial portion 145 of the resin flow passage 144, the resin will then flow both axially and radially over the mandrel surface 114 surrounded by the stationary die 146 in a second inclined portion 147 of the resin flow passage 144.

The stationary sleeve forming the first portion 145 of the flow passage provides a convenient location for adding a view stripe resin into the parison. The view stripe resin is inserted by a resin flow divider 181 positioned in the first portion 145 of the flow passage and connected to a resin supply passage 183. To properly form the view stripe, it is necessary to insert the view stripe resin into the parison at a location without moving surfaces such as the mandrel 114.

The mandrel 114 is formed with an aperture 185 to enable molten resin, which may flow into the recess 167, to exit from the extrusion station.

Referring back to FIG. 2, The cylindrical sleeve 16 is threaded into the extrusion head at the upper end to enable the sleeve to be raised and lowered within the extrusion head. An adjusting gear 56 is fastened to the upper end of the sleeve by bolts 58. A drive gear 60 is used to drive the adjusting gear 56 through an idler gear 62. By rotation of the drive gear 60 the sleeve 16 is caused to rotate and as a result of the screw thread 64, is caused to move axially up or down in the extrusion station. This axial motion of the sleeve 16 causes the gap 66 at the base of the inner flow passage 20 to be either enlarged or reduced in size.

Likewise, the ring 26 is threaded into the extrusion head by threads 68. Rotation of the ring 26 thus raises and lowers the ring 26, increasing or decreasing the size of gap 70 at the discharge end of the outer flow passage 28. Ring 26 is accessible by removing the die 46. Once the die 46 is removed, an appropriate tool is inserted into the bores 74 in the ring 26 to rotate the ring.

By providing capability to adjust the gaps 66 and 70, the proportional thicknesses of the resin layers in the multi-layer parison can be varied over a broader range. This increases the versatility of the extrusion head to make articles having various layer proportions.

The resin passages in the extrusion head are now described with reference to FIGS. 4, 5, 6 and 7. As can be seen, the extrusion stations A, B, C and D are parallel with one another with the axes 76 of the resin flow in each station lying in a common plane. Thus, a longitudinal array of extrusion stations is formed in the extrusion head. An inlet sprue 78 for the middle resin layer is formed in the back wall 80 of the extrusion head and is positioned at the longitudinal center line 82 of the extrusion head. The inlet sprue extends forwardly into the extrusion head to a longitudinal runner 84. The runner 84 extends longitudinally to the outer extrusion stations A and D where gates 38A and 38D direct the resin from the runner 84 into the extrusion stations A and D respectively. Intermediate gates 38B and 38C branch off from the runner 84, directing resin to the extrusion stations B and C respectively. The resin flow paths to extrusion stations A and D are longer than the paths to extrusion stations B and C.

The diameters of the gates 38A-D and the runner 84 have been selected so as to produce an equal pressure drop between the inlet sprue 78 and the extrusion stations so that the resin flow rate into each extrusion station is identical. It will be noted that the runner 84 and a portion of the gates 38A and 38D are of a larger diameter than the gates 38B and 38C. Since the distance traveled to extrusion stations A and D is greater than the distance traveled to extrusion stations B and C, it is necessary to provide larger diameter passages to reduce the pressure drop through those passages. The runner 84 and the gates 38A-D are symmetrical with respect to the extrusion head centerline 82.

The resin for the inner parison layer is supplied through an inlet sprue 88 in the top wall 90 of the extrusion head. The inlet sprue 88 is displaced off the centerline 82 of the extrusion head. The resin flows from inlet sprue 88 into a runner 92 that extends longitudinally through the extrusion head. Gates 36 A-D extend between the runner 92 and the extrusion stations to supply resin to the extrusion stations A-D respectively. The flow passage for the inner resin is similar to that for the middle resin in that the runner extends to the extreme extrusion stations A and D with intermediate gates feeding off of the runner to supply resin to extrusion stations B and C. However, it will be noted that the runner 92, instead of being centered longitudinally relative to the extrusion head, is centered around the inlet sprue 88. As a result, the flow passage to extrusion stations A and D are of equal length while the passages to extrusion stations B and C are of equal length. The lengths of the passages from the sprue to the extrusion station is symmetrical about the inlet sprue. By sizing the diameters of the gates 36B and 36C relative to gates 36A and 36D, it is possible to produce equal pressure drops and hence equal resin flow rates to each extrusion station with flow plugs, described below, only needed for fine control.

The outer resin layer is supplied through an inlet sprue 94 which also extends from the top wall 90 of the extrusion head. A runner 96 extends longitudinally through the die head from the inlet sprue 94 to supply resin to the gates 40A-D. The inlet sprue 94 is also displaced from the centerline 82 of the extrusion head as was the inlet sprue 88 for the inner resin layer. The runner 96 and gates 40A-D are similarly constructed and are also centered relative to the inlet sprue 94 so that the resin flow paths to extrusion stations A and D are of equal length while the flow paths to extrusion stations B and C are of equal length. Likewise, the gates 40B and 40C are of a smaller diameter than 40A and 40D so that equal pressure drops are produced resulting in equal flow rates to each station.

The extrusion head of the present invention supplies equal resin flow rates to each of the extrusion stations for each of the resin layers and at the same relative sequence of events at the beginning of each cycle to produce essentially identical multi-layer parisons. This has been accomplished without the formation of resin flow passages that are of equal length to each extrusion station, enabling the extrusion head to be smaller and easier to manufacture. The passages for the three resin layers are configured so that the volume ratio of resin in the flow passages for one layer compared to another are equal for each extrusion station. For example, the ratio of the resin volume for the inner layer to the middle layer for station A is the same as for station B, etc. As a result, the relative sequence of events, that is, the relative starting times of resin flow in the individual passages at their merger point, will be the same for each parison. The relative compression delay will be the same for each parison.

Figure 5:
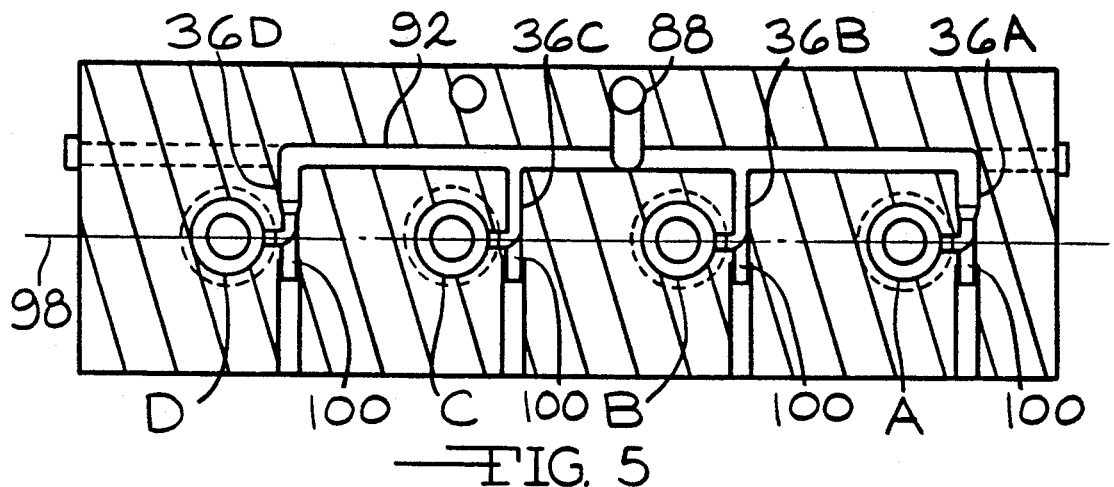
FIG. 5 is a sectional view of the extrusion head as seen from substantially line 5—5 of FIG. 1.
Figure 6:
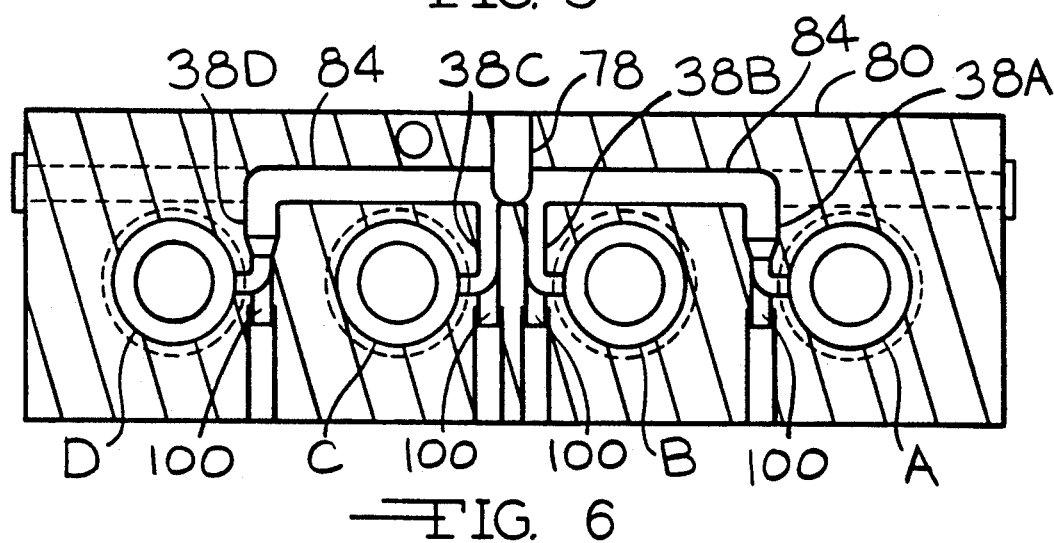
FIG. 6 is a sectional view of the extrusion head as seen from substantially line 6—6 of FIG. 1.
Figure 7:
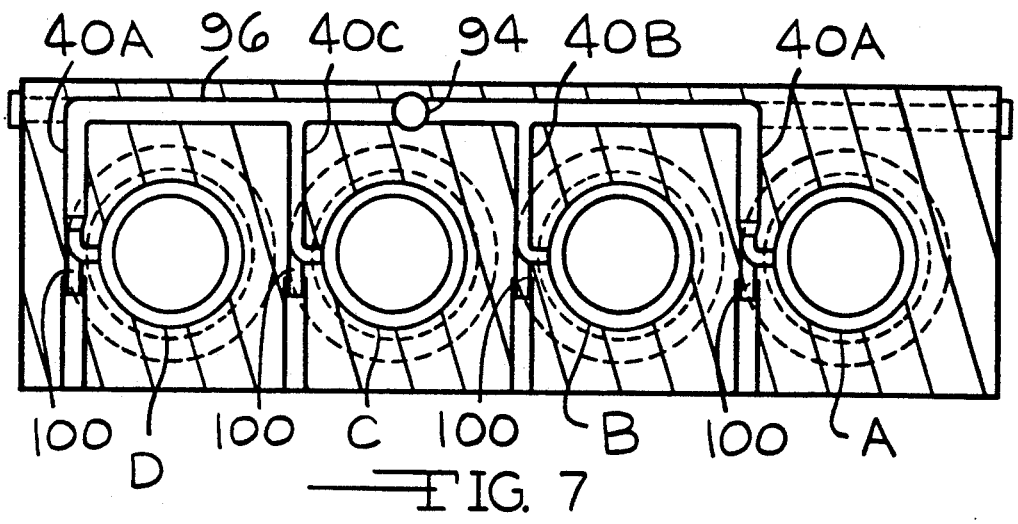
FIG. 7 is a sectional view of the extrusion head as seen from substantially line 7—7 of FIG. 1.

The axes 76 of the extrusion stations lie on a common plane 98, as shown in FIG. 5. This plane 98 is preferably the plane upon which mold halves below the extrusion head open and close around the extruded parisons. As can be seen in FIGS. 5, 6 and 7, the gates 36, 38 and 39 all enter the extrusion stations and discharge the resin into the annular receiving portions 30, 32 and 34 on this center plane 98. This assures that the weld line formed in the receiving portions as the resin flows circumferentially around these portions and meets again diametrically opposite from the gates will coincide with the mold parting lines. This reduces visual imperfections in the molded article by placing the parison weld line on the mold parting line.

To precisely control the resin flow into each extrusion station, each gate includes an adjustable plug 100. The plug 100 from gate 36A is enlarged in FIG. 8. The plug forms a surface 102 forming the wall of the gate at the right angle bend in the gates. The plug can be moved into the flow passage in the direction of the flow passage as shown in the broken line position of the surface 102 to restrict the flow passage and reduce the resin flow rate therethrough. The surface 102 is merged smoothly with the side walls of the gate and is preferably concave to provide a smooth merger. As a result, the plug does not produce a stagnation pocket of resin downstream of the plug. This is made possible by placing the flow plugs at a bend in the gates whereby the plug can be merged smoothly with the wall of the gate regardless of its position within the gate. Pins 104 connect the plugs 100 to mounting bosses 106 on the front face of the extrusion head wherein the pins can be manually manipulated to adjust the position of the plugs 100 in their respective gates. By placing the flow plugs in the gates and moving the plugs along the flow direction of the first portion of the gates, the adjustment controls are placed at the front of the extrusion head for easy access by a machine operator.

Several features of the extrusion head 10 enable the extrusion head to produce multiple parisons that are essentially identical. One feature is the configuration of the resin flow passages such that the ratio of the resin volume for one resin relative to another resin for each extrusion station is the same. This enables the same relative sequence of events to take place in the starting and stopping of the resin flow. Another feature that enables the production of identical parisons is the symmetrical configuration of the runners and gates relative to their respective inlet sprue for each resin layer. This simplifies the overall structure of the flow passages and also results in equal volumes in the flow passages for stations A and D and for stations B and C. The symmetrical nature of the flow passages also facilitates the equal volume ratios for the various resins and extrusion stations.

Other features related to the construction of the extrusion station results in the production of a quality parison. One feature is the location of the single resin merger point at the lower end of each extrusion station so that the volume of merged resin remaining in the main passage 44 from the merger point to the outlet orifice 48 is less than the volume of resin contained in the front flash of the molded article. As a result, a visual defect formed in the parison at the beginning of each resin shot is contained in the front flash and not the finished article. Another feature which provides versatility to the extrusion head is the ability to adjust the relative thicknesses of the individual resin layers at the resin merger point. This enables the extrusion head to be altered to produce parisons and finished products having different proportional layer thicknesses in the parison and product wall.

It is to be understood that the invention is not limited to the exact construction or method illustrated and described above, but that various changes and modifications may be made without departing from the spirit and scope of the invention as defined in the following claims. For example, while the invention has been described in the context parison extrusion, the invention can be used to mold other intermediate articles such as preforms.

I claim:

1. An apparatus for intermittent multiple layer multiple parison extrusion comprising:
   an extrusion head;
   means forming multiple extrusion stations within said extrusion head each having a lengthwise axis with the axes of said multiple stations being arranged coplanar and parallel with one another forming a longitudinal array of said extrusion stations within said head, said stations each extruding parisons of multiple concentric layers of thermoplastic resins; and
   passage means within said extrusion head for feeding resins to said stations, said passage means being configured to produce substantially equal ratios of resin volume for one resin layer to another resin layer for each station while the resin volume in said passage means for each layer is not equal for all stations.

2. The apparatus of claim 1 wherein said passage means includes for each resin an inlet sprue for communication with a source of molten resin, a runner extending longitudinally through said extrusion head and gates connecting each station with said runner, the lengths of said passage means from each inlet sprue to said extrusion stations being symmetrical relative to each inlet sprue.

3. The apparatus of claim 2 wherein said passage means for only one of said resins has an inlet sprue centered longitudinally within said extrusion head.

4. The apparatus of claim 2 wherein said gates feed resin to said stations at the longitudinal centerline of said longitudinal array of extrusion stations.

5. The apparatus of claim 1 further comprising means for producing substantially equal pressure drops in said passage means for each resin from said inlet sprue to each extrusion station whereby the flow rate of said resin is substantially the same to each station.

6. The apparatus of claim 5 wherein said means for producing substantially equal pressure drops includes flow plugs in each of said gates and means accessible from a front surface of said extrusion head for adjusting the positions of said flow plugs.

7. The apparatus of claim 6 wherein each gate has first and second portions oriented substantially normal to one another and joined by bend portions and said flow plugs forming concave surfaces of said bend portions which are smoothly merged with said gates, said plugs being adjustable by movement of said concave surface in a direction along the centerline of the first portion of said gates.

8. The apparatus for multiple layer, multiple parison extrusion of claim 1 wherein said parison is subsequently enclosed within a blow mold for blow molding into a finished article with said blow mold pinching longitudinal ends of said parison forming front and rear flashes on said finished article, said apparatus further comprising within each extrusion station:
   means for receiving each of said multiple resins and for forming separated concentric tubular bodies of said resins flowing axially through said stations;
   means for merging all of said separated tubular bodies of resin into said multiple layer parison flowing axially through said stations, said merging means acting to merge all of said separated tubular bodies together at substantially one axial location; and
   a single tubular passage for said parison from said merger means to an outlet orifice, said tubular passage having a resin volume less than the volume of resin contained within the front flash of the finished article whereby during intermittent extrusion from said extrusion head, the resin in said tubular passage at the beginning of each extrusion cycle is contained within the front flash.

9. The apparatus of claim 8 wherein said tubular passage is formed within a stationary annular die mounted to said extrusion head at the base of each of said stations.

10. The apparatus of claim 9 wherein said tubular passage is formed around a portion of a stationary sleeve within said extrusion station, said sleeve also forming an inner surface of a separated passage for the concentrically innermost separated tubular resin body, and a mandrel mounted for axial movement of the base of said sleeve.

11. The apparatus of claim 10 wherein said mandrel telescopes over the base of said sleeve.

12. The apparatus of claim 1 further comprising within each station:
    means for receiving each of said multiple resins;
    means forming concentric annular passages to provide annular flow streams of each of said resins, said flow streams being separate from one another and flowing from said receiving means toward an outlet orifice;
    means for merging said separate concentric flow streams of said resins into a single flow stream having multiple concentric layers of said resins, said merged flow streams flowing through said outlet orifice to form said parison; and
    means for varying the thickness of at least one of said annular passages to uniformly increase or decrease the thickness of said at least one of said annular passages about the entire circumference of said at least one of said annular passages at a downstream end of said at least one of said annular passages immediately upstream of where the resin flow stream in said at least one of said annular passages merges with another of said resin flow streams whereby the proportional thickness of at least one of said multiple concentric layers of resin within said merged flow stream is increased or decreased relative to the thickness of the other resin layers in said merged flow stream.

13. The die head of claim 12 wherein said means for varying the thickness of at least one of said passages includes means for individually varying the thickness of all but one of said passages at the downstream end of said passages.

14. The die head of claim 12 wherein:
    a downstream terminal portion of each variable thickness passage is formed by two spaced annular surfaces which are inclined relative to said axis; and
    said means for varying the thickness of said passages includes means for axially moving one of said two spaced annular surfaces relative to the other.

15. The die head of claim 14 wherein the thickness of each variable thickness passage is infinitely variable.

16. Apparatus for multiple layer extrusion of resin for producing multiple intermediate articles comprising:
    an extrusion head;
    a plurality of extrusion stations within said extrusion head and each having a lengthwise axis with the axes of each station being arranged coplanar and parallel with one another forming a longitudinal array of said extrusion stations within said head, said stations extruding multiple concentric layers of thermoplastic resins;
    individual passage means within said extrusion head for feeding each resin separately to said stations, said passage means including for each resin an inlet sprue for communication with a source of molten resin, a runner extending longitudinally through said extrusion head and gates connecting each station to said runner, the lengths of said passage means from each said inlet sprue to each said extrusion station being symmetrical relative to each said inlet sprue; and
    said passage means being configured to produce substantially equal ratios of resin volume for one resin layer to another resin layer for each station while the resin volume in said passage means for each layer is not equal for all stations.

17. The apparatus of claim 16 wherein said gates feed resin to the extrusion stations at the centerline of the longitudinal array of extrusion stations within the extrusion head.

* * * * *